United States Patent
Gupta et al.

(10) Patent No.: US 11,100,123 B2
(45) Date of Patent: Aug. 24, 2021

(54) SHARING INTERMEDIATE DATA IN MAP-REDUCE

(71) Applicant: International Business Machines Corporation, Armonk, NY (US)

(72) Inventors: Himanshu Gupta, New Delhi (IN); Nitin Gupta, Saharanpur (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 783 days.

(21) Appl. No.: 15/473,283

(22) Filed: Mar. 29, 2017

(65) Prior Publication Data

US 2018/0285440 A1  Oct. 4, 2018

(51) Int. Cl.
  *G06F 16/2458*  (2019.01)
(52) U.S. Cl.
  CPC .................. *G06F 16/2471* (2019.01)
(58) Field of Classification Search
  CPC .................................................. G06F 16/2471
  USPC ........................................................ 707/737
  See application file for complete search history.

(56) References Cited

U.S. PATENT DOCUMENTS

| | | | | |
|---|---|---|---|---|
| 7,590,620 B1* | 9/2009 | Pike | ..................... | G06F 11/1482 |
| 8,726,290 B2* | 5/2014 | Dasdan | ................ | G06F 9/5083 718/105 |
| 8,775,425 B2* | 7/2014 | Gupta | ............... | G06F 16/24532 707/737 |
| 8,788,499 B2* | 7/2014 | Kunnummal | ....... | G06F 16/9535 707/737 |
| 2008/0086442 A1* | 4/2008 | Dasdan | ................. | G06F 16/278 |
| 2011/0302583 A1* | 12/2011 | Abadi | ................. | G06F 16/2471 718/102 |
| 2014/0344195 A1* | 11/2014 | Drew | ...................... | G06N 5/04 706/12 |
| 2015/0088924 A1* | 3/2015 | Abadi | ............... | G06F 16/90335 707/769 |
| 2015/0120928 A1 | 4/2015 | Gummaraju et al. | | |

OTHER PUBLICATIONS

Okcan et al., "Anti-Combining for MapReduce", Jun. 2014, ACM, pp. 839-850, 12 pages printed. (Year: 2014).*

(Continued)

*Primary Examiner* — Tony Mahmoudi
*Assistant Examiner* — Michael Le
(74) *Attorney, Agent, or Firm* — Ference & Associates, LLC

(57) ABSTRACT

One embodiment provides a method, including: receiving a plurality of data for job processing, wherein the job processing processes the plurality of data into (i) at least one map phase and (ii) at least one reduce phase; generating a plurality of key-value groups from the plurality of data, wherein the plurality of key-value groups are grouped from data pairs including a key and a value and wherein each of the key-value groups include a grouping of data pairs having a common key and a plurality of values associated with the common key; identifying values common to at least a subset of the key-value groups; generating, based upon the identifying, new key-value groups, wherein at least a subset of the new key-value groups includes key-value groups having common keys and the identified common values; and communicating the new key-value groups to the at least one reduce function for processing.

18 Claims, 6 Drawing Sheets

(56) References Cited

OTHER PUBLICATIONS

Agrawal et al., "Data Partitioning for Minimizing Transferred Data in MapReduce", 2013, Globe 213, LNCS 8059, pp. 1-12, 12 pages printed. (Year: 2013).*

Wang, Guoping et al., "Multi-Query Optimization in MapReduce Framework", The 40th International Conference on Very Large Data Bases, Proceedings of the VLDB Endowment, Sep. 1-5, 2014, Hangzhou, China, 12 pages, vol. 7, No. 3, VLDB Endowment.

Bu, Yingyi et al., "HaLoop: Efficient Iterative Data Processing on Large Clusters", The 36th International Conference on Very Large Data Bases, Proceedings of the VLDB Endowment, Sep. 13-17, 2010, Singapore, 12 pages, vol. 3, No. 1, VLDB Endowment.

Bhatotia, Pramod et al., "Incoop: MapReduce for Incremental Computations", SOCC '11, Oct. 27-28, 2011, Cascais, Portugal, 14 pages, ACM Digital Library.

Nykiel, Tomasz et al., "MRShare: Sharing Across Multiple Queries in MapReduce", The 36th International Conference on Very Large Data Bases, Proceedings of the VLDB Endowment, Sep. 13-17, 2010, Singapore, 12 pages, vol. 3, No. 1, VLDB Endowment.

Lei, Chuan et al., "Redoop: Supporting Recurring Queries in Hadoop", 17th International Conference on Extending Database Technology (EDBT), Mar. 24-28, 2014, Athens, Greece, 12 pages, OpenProceedings.Org.

* cited by examiner

SHARING INTERMEDIATE DATA IN MAP-REDUCE

BACKGROUND

Different techniques exist for processing information. One common technique for processing information, particularly large volumes of information, is using a MapReduce program. A MapReduce program allows for processing and generating large sets of information using a parallel, distributed algorithm. A MapReduce program includes a Map function that performs a user-defined function on all records of input data and transforms the input to a set of key-value pairs. Secondly, a MapReduce program includes a Reduce function that processes the Map function output and applies a user-defined function on the set of map output key-value pairs. The MapReduce program is typically implemented in different software frameworks. For example, the MapReduce may be implemented in JAVA® as HADOOP®.

BRIEF SUMMARY

In summary, one aspect of the invention provides a method, comprising: utilizing at least one processor to execute computer code that performs the steps of: receiving a plurality of data for job processing, wherein the job processing processes the plurality of data into (i) at least one map phase processed using at least one map function and (ii) at least one reduce phase processed using at least one reduce function; generating, using the at least one map function, a plurality of key-value groups from the plurality of data, wherein the plurality of key-value groups are grouped from data pairs comprising a key and a value produced using the at least one map function and wherein each of the key-value groups comprises a grouping of data pairs having a common key and a plurality of values associated with the common key; identifying, across the key-value groups, values common to at least a subset of the key-value groups; generating, based upon the identifying, new key-value groups, wherein at least a subset of the new key-value groups comprises key-value groups having common keys and the identified common values; and communicating the new key-value groups to the at least one reduce function for processing.

Another aspect of the invention provides an apparatus, comprising: at least one processor; and a computer readable storage medium having computer readable program code embodied therewith and executable by the at least one processor, the computer readable program code comprising: computer readable program code that receives a plurality of data for job processing, wherein the job processing processes the plurality of data into (i) at least one map phase processed using at least one map function and (ii) at least one reduce phase processed using at least one reduce function; computer readable program code that generates, using the at least one map function, a plurality of key-value groups from the plurality of data, wherein the plurality of key-value groups are grouped from data pairs comprising a key and a value produced using the at least one map function and wherein each of the key-value groups comprises a grouping of data pairs having a common key and a plurality of values associated with the common key; computer readable program code that identifies, across the key-value groups, values common to at least a subset of the key-value groups; computer readable program code that generates, based upon the identifying, new key-value groups, wherein at least a subset of the new key-value groups comprises key-value groups having common keys and the identified common values; and computer readable program code that communicates the new key-value groups to the at least one reduce function for processing.

An additional aspect of the invention provides a computer program product, comprising: a computer readable storage medium having computer readable program code embodied therewith, the computer readable program code executable by a processor and comprising: computer readable program code that receives a plurality of data for job processing, wherein the job processing processes the plurality of data into (i) at least one map phase processed using at least one map function and (ii) at least one reduce phase processed using at least one reduce function; computer readable program code that generates, using the at least one map function, a plurality of key-value groups from the plurality of data, wherein the plurality of key-value groups are grouped from data pairs comprising a key and a value produced using the at least one map function and wherein each of the key-value groups comprises a grouping of data pairs having a common key and a plurality of values associated with the common key; computer readable program code that identifies, across the key-value groups, values common to at least a subset of the key-value groups; computer readable program code that generates, based upon the identifying, new key-value groups, wherein at least a subset of the new key-value groups comprises key-value groups having common keys and the identified common values; and computer readable program code that communicates the new key-value groups to the at least one reduce function for processing.

A further aspect of the invention provides a method, comprising: utilizing at least one processor to execute computer code that performs the steps of: processing, using at least one map function to process map phase data and at least one reduce function to process reduce phase data, a plurality of data; wherein the processing comprises: producing, using the at least one map function, key-value pairs comprising a key and a value from the plurality of data; grouping, using the at least one map function, at least a subset of the key-value pairs into key-value groups comprising a key shared with a plurality of values; grouping at least a subset of the key-value groups into new key-value groups, wherein the new-key value groups comprise key-value groups having values shared with a plurality of keys; and processing, using a reduce function, (i) the new key-value groups, (ii) the key-value groups not belonging to a new key-value group, and (iii) the key-value pairs not belonging to a key-value group.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
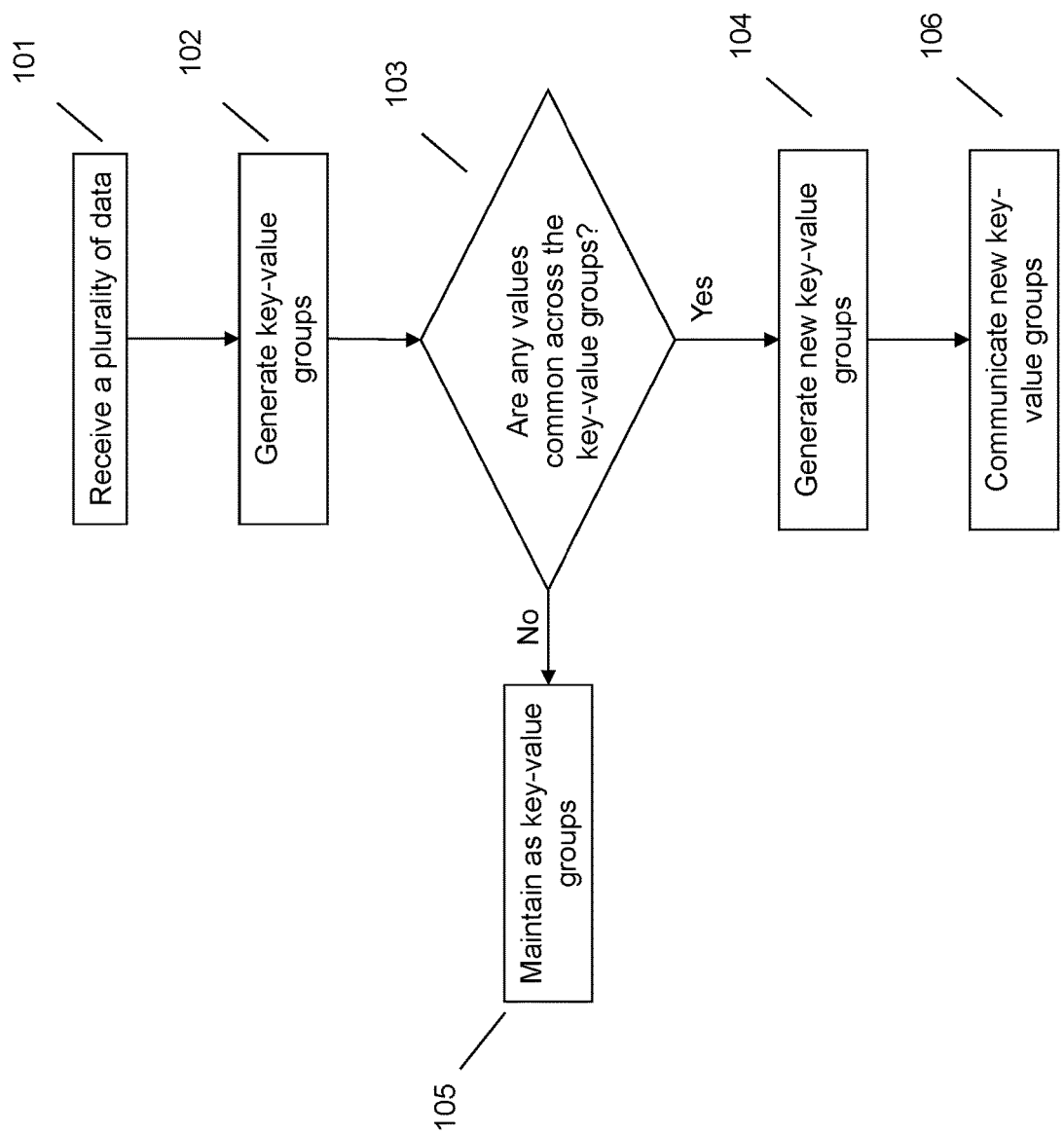
FIG. 1 illustrates the data flow from map functions to reduce functions.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

In a typical MapReduce technique, the input information is loaded and sent to the map function. The map functions first perform the assigned operation and the map-reduce framework then shuffles the map-output to the reducers. The map output is shuffled in such a manner so that all the pairs with the same key are communicated to the same reducer. The reduce tasks then process the shuffled data and generate the final output. The system may have many mappers performing map functions and many reducers performing reduce functions. One drawback with currently used techniques is that a value in the key-value map output may be communicated to the same machine multiple times in this shuffling process. This happens because multiple key-value pairs in the map output may have the same value but different keys. If the data for n such keys are reduced on the same machine, and if a value v is common across these n keys then this value v ends up getting communicated n times to the same machine which is clearly redundant. A key-value pair can be understood to be a function having a key and a value, for example, (1, v), wherein 1 is the key and v is the value. Thus, an example of multiple key-value pairs with the same value, but different keys, would be (1, v), (2, v), (3, v). Accordingly, the same value (v) is communicated to each of the reducers performing the reduce function on the keys 1, 2, 3. If the reduce tasks handling these three keys run on the same machine, this value (v) is communicated to the same machine three times.

Thus, one disadvantage with such a technique is that, in many use-cases, a significant overlap exists between inputs for reduce-keys, and the common data are communicated multiple times. Since communication cost is one of the most significant contributors to overall cost, these overlapping communications contribute to the cost. Some of the examples of use-cases include, but are not limited to, spatial data processing, inequality joins, set-similarity joins, and the like. In all these use-cases the volume of information that is to be communicated to the reducer(s) is typically far greater than the input volume of information because of the processing algorithm. Thus, the information communicated to the reducer(s) is significant. As an example, the key-value pairs output by map functions are grouped together so as all pairs with the same key are grouped together. For example, if a map task produces six key-value pairs (1,u1), (1,u2), (1,u3), (1,u4), (2,u1), (2,u2), this information will get grouped as (1, [u1, u2, u3, u4]) and (2, [u1, u2]), as shown in FIG. 2, which is described in more detail below. The values [u1, u2, u3, u4] are communicated to the reduce task handling key 1, while the values [u1, u2] are communicated to the reduce task handling key 2. If these two reduce tasks run on the same machine, then the values u1 and u2 are communicated to the same machine twice, which is redundant.

Accordingly, an embodiment provides a system and method for reducing the information communicated to and processed by the reduce function/reducer(s). In the described system, the key-value pairs are grouped differently than conventional systems. In the conventional systems, the system receives the information to be processed using the map function(s). The information is passed to the map function which generates a plurality of key-value pairs.

A key-value pair is a dataset or function that has a key and a value, for example, (1, v), where 1 is the key and v is the value. The output of the map function is then processed and transformed into key-value groups such that all the values in key-value pairs with the same key are grouped together. A key-value group includes a single key with multiple values, for example, (1, [v1, v2, v3]), where 1 is the key and v1, v2, and v3 are the values. If a key-value pair does not share the key with any other pair, the corresponding value group will contain only a single value.

Unlike conventional systems, the system as described herein may identify keys having common values. As an example, one key-value group includes (1, [u1, u2, u3, u4]) and another key-value group includes (2, [u1, u2]). The system may identify that the values u1 and u2 are common between keys 1 and 2. Once the common values are identified, the system may generate new key-value groups having common keys and common values. Using the example above, the system may group the key-value groups into the following functions ([1,2], [u1, u2]) and (1, [u3, u4]), signifying that keys 1 and 2 have common values u1 and u2, and key 1 additionally has values u3 and u4. The new key-value groups are then communicated to the reduce function(s) for processing. This also requires a new method for communicating these data to the reduce tasks as discussed in greater detail herein.

Such a system provides a technical improvement over current techniques for MapReduce in that the system is more efficient and communicates less information. Particularly, the system reduces the volume of data communicated to the reduce function(s). Rather than communicating every value to the reduce function, the system identifies the duplicated or common values in a map task output that have been assigned as input to reduce tasks running on the same machine and communicates these values only once to this machine. Accordingly, the communication expenses are reduced and the time to complete information processing is also reduced.

Referring now to FIG. 1, a plurality of information for processing is received at 101. The requested processing algorithm may include one or more map functions and one or more reduce functions. In other words, the system for processing the information may include one or more mappers for carrying out the map function and one or more reducers for carrying out the reduce function. As an example, the system may use a HADOOP® framework for processing information. The HADOOP® framework may include a HADOOP® distributed file system for storing the information which is shared across the different machines that process the information.

The information may be sent to the map function(s) for processing, for example, read from the storage location and passed to the map function. The map function may generate a plurality of key-value pairs. The key-value pairs may include a single key and a single value, for example, as expressed as a function (1, v1), where 1 is the key and v1 is the value. Other formats for key-value pairs are possible and contemplated. The map function may also generate a plurality of key-value groups. The key-value groups may include a single key and a plurality of values. The key may be common or shared among the values.

Figure 2:
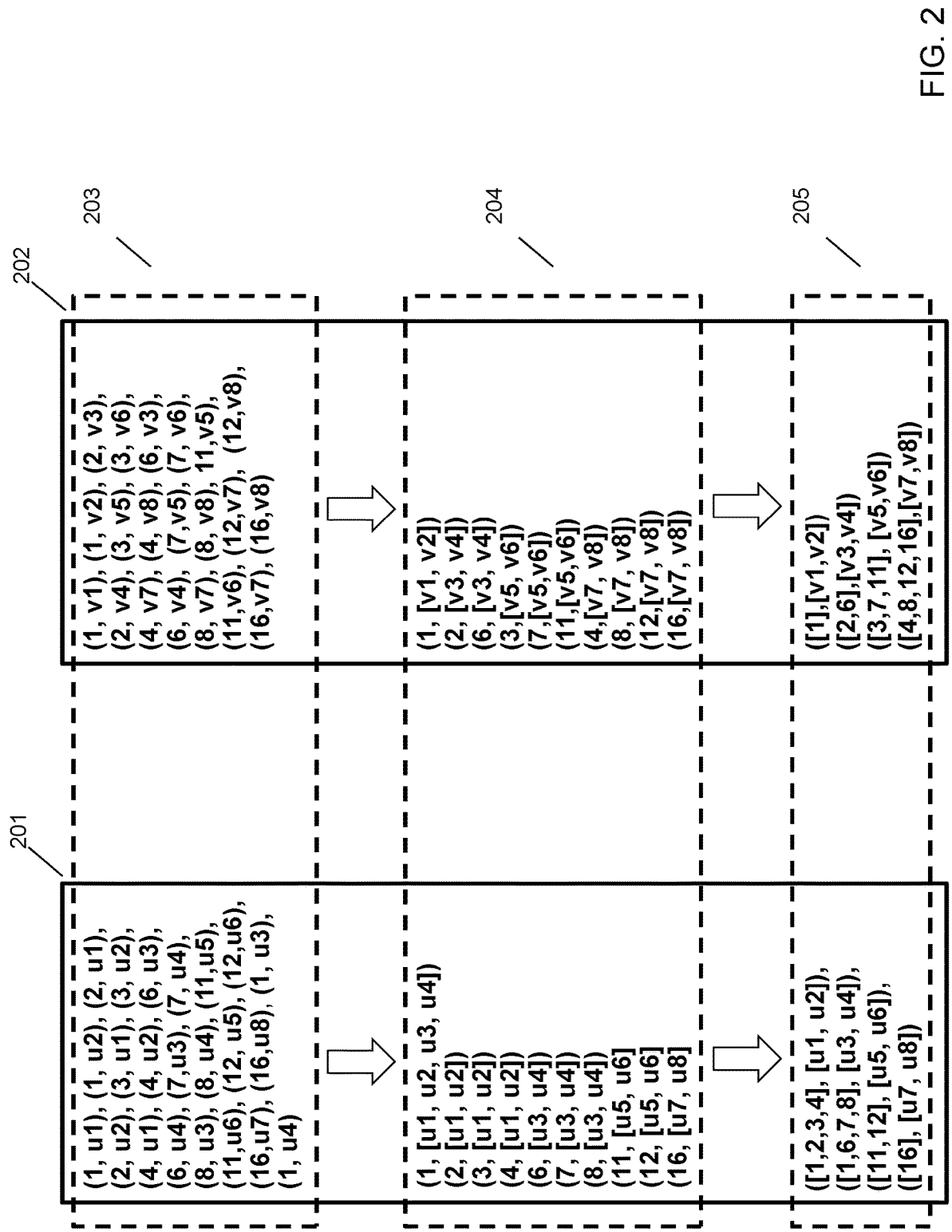
FIG. 2 illustrates an example transformation of map output.

For example, FIG. 2 illustrates an example processing of the information. Two groups of information are shown 201 and 202. The output of two map tasks is shown at 203. The map function identifies key-value pairs 203 having common keys and groups these key-value pairs into key-value groups 204, as completed using current techniques. Thus, using information 201 as an illustrated example, values u1, u2, u3, and u4 all have common key 1. Thus, this key and corresponding values are grouped into a key-group (1, [u1, u2, u3, u4]). Although not shown in FIG. 2, any key-value pairs that do not have a key common to other key-value pairs are not grouped. For example, if the information resulted in key-value pair (17, u1), this key-value pair would not be grouped with another key-value pair because the key 17 only has a single value u1 associated with it. The system as described herein takes the output of the map tasks 203, and transforms it as shown at 205 and as described in more detail below.

At 103 the system may determine if any of the key-value groups include values which are common across the key-value groups. This determination is done for the output of each map task separately. Using the example of FIG. 2, information 201 is assigned to a first machine and information 202 is assigned to a second machine. 201 and 202 are the outputs of two different map tasks running on two different machines. Thus, even if common values existed between information 201 and 202, the system will not identify the values as common because the information is generated on different machines.

If common values are not identified across key-value groups, the key-value groups will be maintained as received from the map function at 105. If, however, common values are identified, the system may generate new key-value groups at 104. The new key-value groups may include common keys and common values. Using the example of FIG. 2, the key-value groups 204 are converted to new key-value groups 205 where keys having common values are grouped along with the common values. For example, keys 1, 2, 3, and 4 all have common values u1 and u2. Accordingly, the new key-value group is generated ([1, 2, 3, 4], [u1, u2]).

As with the key-value pairs, key-value groups not having common values will remain ungrouped. For example, key 16 includes unique value u7 and u8. Thus, the key-value group ([16], [u7, u8]) is maintained. Additionally, for keys having common values across different groups, different new key-groups will be generated for each of the common values. As an example, key 1 includes values u1 and u2 which are common to keys 2, 3, and 4. Accordingly, a new key-value group is generated ([1, 2, 3, 4], [u1, u2]). However, key 1 also includes values u3 and u4, which are common to keys 6, 7, 8. Thus, another new key-value group including key 1 is generated ([1, 6, 7, 8], [u3, u4]).

At 106 the new key-value groups are communicated to the reduce function(s). The proposed system carries out this communication in a new and innovative manner so that the common values among keys being reduced on the same machine are communicated only once. Each machine running a reduce task maintains a cache where the key-value groups being transferred to the machine are stored. For example, if key 1 is being reduced on machine 1 and the key-value group ([1, 2, 3, 4], [u1, u2]) is communicated to machine 1, then the cache on machine 1 will store these data. This cache also maintains a record of the keys which have been reduced on this machine.

When the reduce processing of a key k is scheduled on a machine m, the system checks the cache on machine m to see if any common values exist between key k and the keys which have previously been processed on machine m. If there are any common data, the common data will be retrieved from the cache. This is done by checking each key-group and verifying whether the key-group contains key k or not. If key k is present in a key-group, the corresponding set of values is retrieved from the cache. The uncommon part (e.g., the set of values that are not common between key k and the previously processed keys) is retrieved from the map output. This is done by checking each key-group in the transformed map output(s) and verifying that the key-group contains key k, but does not contain any key which has already been processed on machine m. If these two conditions are satisfied then the corresponding set of values are transferred to machine m. These new data, which are fetched from the map output, are also stored in the cache for future use. Since only the uncommon part is fetched from the map tasks, the common data are transferred only once to the reduce side resulting in huge communication and time savings.

Figure 3A:
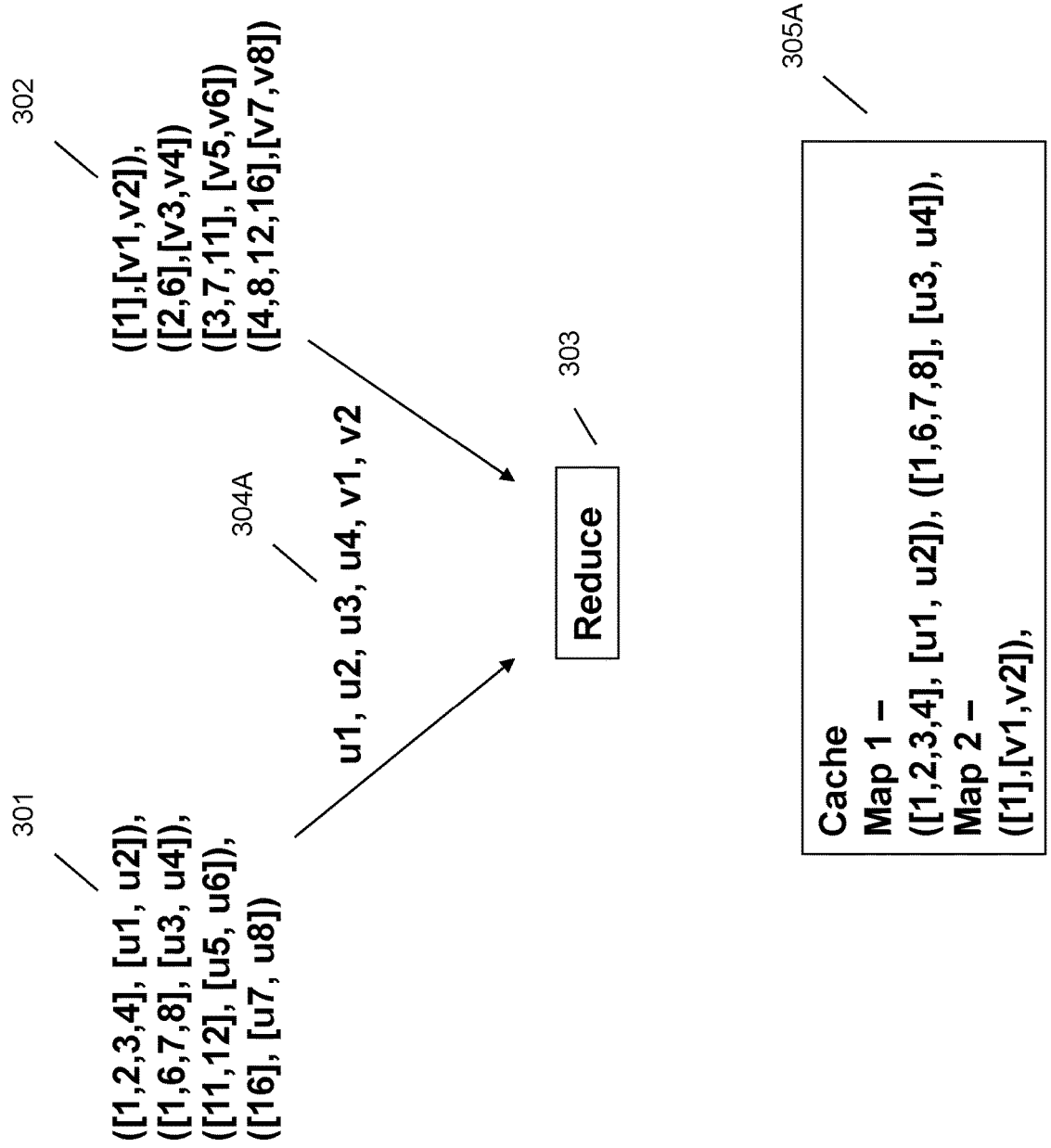
FIGS. 3A-3C illustrate an example of transferring data for a reduce function.
Figure 3B:
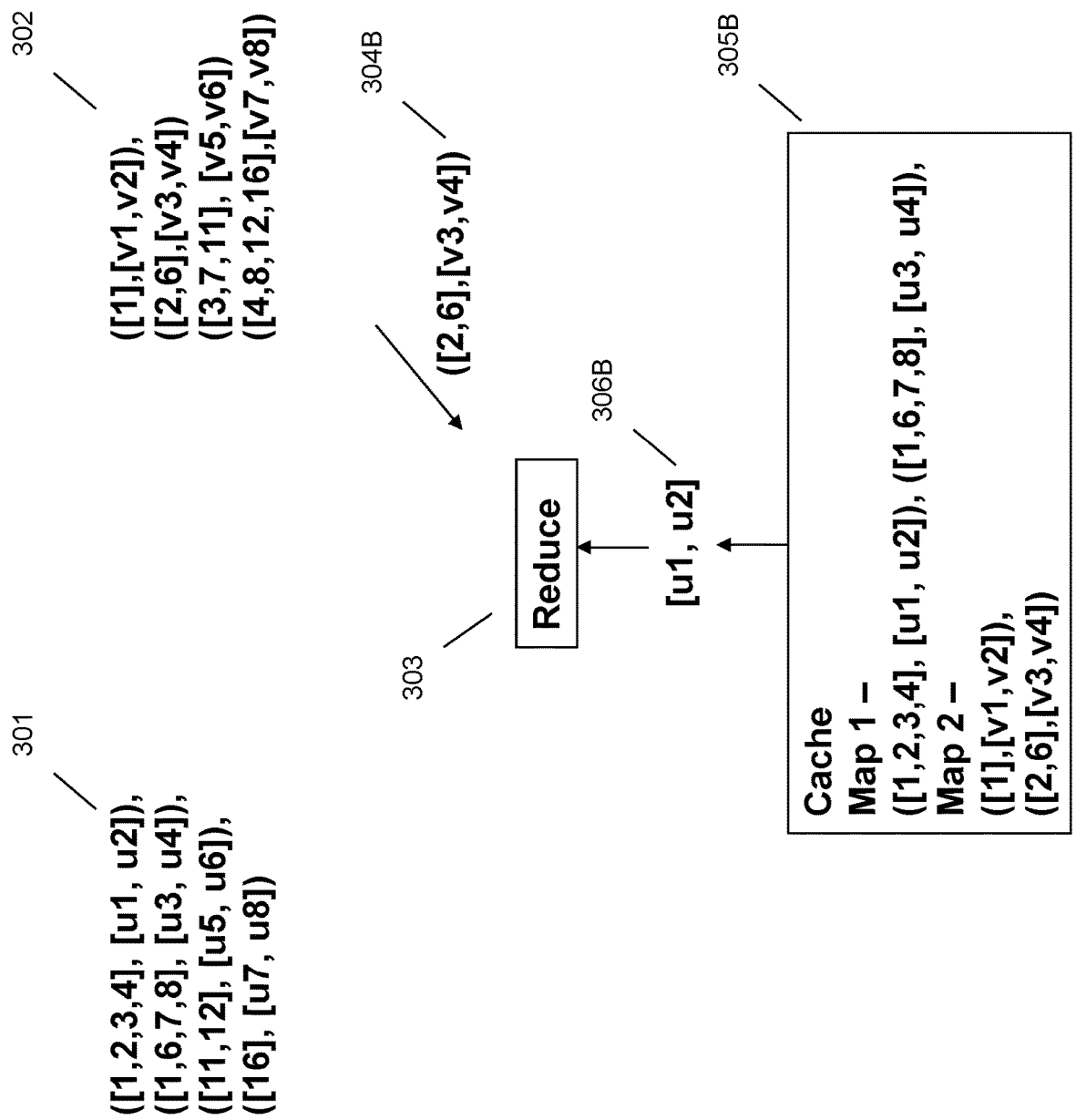
Figure 3C:
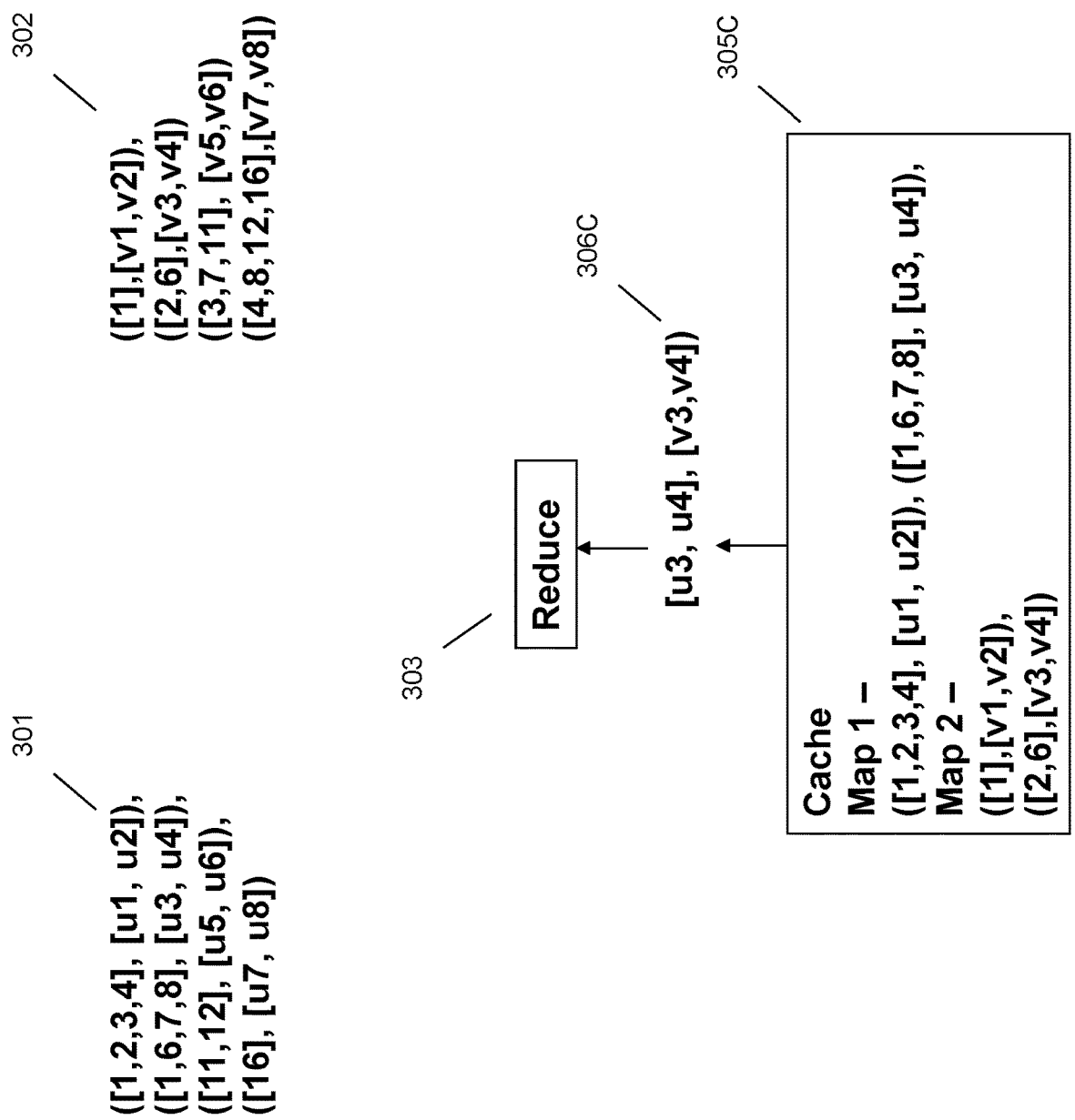

FIGS. 3A-3C illustrate an example process for communicating the data between the map output, reduce function, and cache. Referring first to FIG. 3A, key 1 is scheduled for processing on machine m. Since this is the first key being processed on machine m, the cache will be empty. Accordingly, the system is looking for key-sets containing key 1 from the output from machine 1 containing the new key-value groups 301 and from machine 2 containing new key-value groups 302, corresponding to 205 of FIG. 2. The map output 301 contains two key-groups including key 1, [1, 2, 3, 4] and [1, 6, 7, 8]. Accordingly, the corresponding key-sets ([1, 2, 3, 4], [u1, u2]) and ([1, 6, 7, 8], [u3, u4]) are transferred to the reducer 303 of machine m. The system also looks at map output 302 and identifies that one key-group contains key 1. Accordingly, the key-set ([1], [v1, v2]) is communicated to reducer 303 of machine m. In this way, all the values 304A for key 1 have been transferred to machine m. Additionally, the cache 305A at machine m is updated and maintains the pairs ([1, 2, 3, 4], [u1, u2]), ([1, 6, 7, 8], [u3, u4]) for map task 1 and pairs ([1], [v1, v2]) for map task 2.

Now moving to FIG. 3B, assume that key 2 is now scheduled for processing on machine m. After identifying that one key-group contains key 2 from map output 1 301 (i.e., ([1, 2, 3, 4], [u1, u2])) and one key-group contains key 2 from map output 2 302 (i.e., ([2, 6], [v3, v4])), the system will look at the cache on machine m to identify whether any common values exist between key 1 and key 2. The system will identify that values [u1, u2] are common among keys 1 and 2 from map task 1 301 and no values are common between keys 1 and 2 from map task 2 302. Accordingly, the system will not transfer the common values between key 1 and 2 from map task 1 301, and will instead read 306B these from the cache 305B. In this way, values u1 and u2 which are values common to keys 1 and 2 are only transferred to machine m once. Since the system has identified that map output 302 does not have any common values between key 1 and key 2, the system will transfer the values 304B for key 2 from map output 2 302. These values will also be stored in cache 305B.

Now moving to FIG. 3C, assume that key 6 is now scheduled for processing on machine m. After identifying that one key-group contains key 6 from map output 301 (i.e., ([1, 6, 7, 8], [u3, u4])) and one key-group contains key 6 from map output 302 (i.e., ([2, 6], [v3, v4])), the system will look at the cache on machine m to identify whether any common values exist between key 6 and any of the keys 1 and 2. The system will identify that values [u3, u4] are common among keys 1 and 6 from map output 1 301 and values [v3, v4] are common among keys 1 and 6 from map output 2 302. Accordingly, the system will not transfer these common values, and will instead read 306C from cache 305C. Since the system has identified that no uncommon values exist, no values will be read from either map output 1 301 or map output 2 302.

Additionally, the system supposes a scheduler which can exploit the new way of generating key-value groups for further reducing the volume of data transferred. Accordingly, an intelligent scheduler may be implemented on the system which schedules the reduce tasks in a manner which optimizes or maximizes the opportunities for data sharing. The scheduler may inspect the transformed map output and gather relevant statistics (e.g., how many keys share values, how many values are shared, machine schedules, etc.) to determine how the reduce tasks can be scheduled to maximize the opportunities for information sharing. For example, the scheduler may identify keys with maximal overlap of values and schedule these keys for reduce side processing on the single machine.

Figure 4:
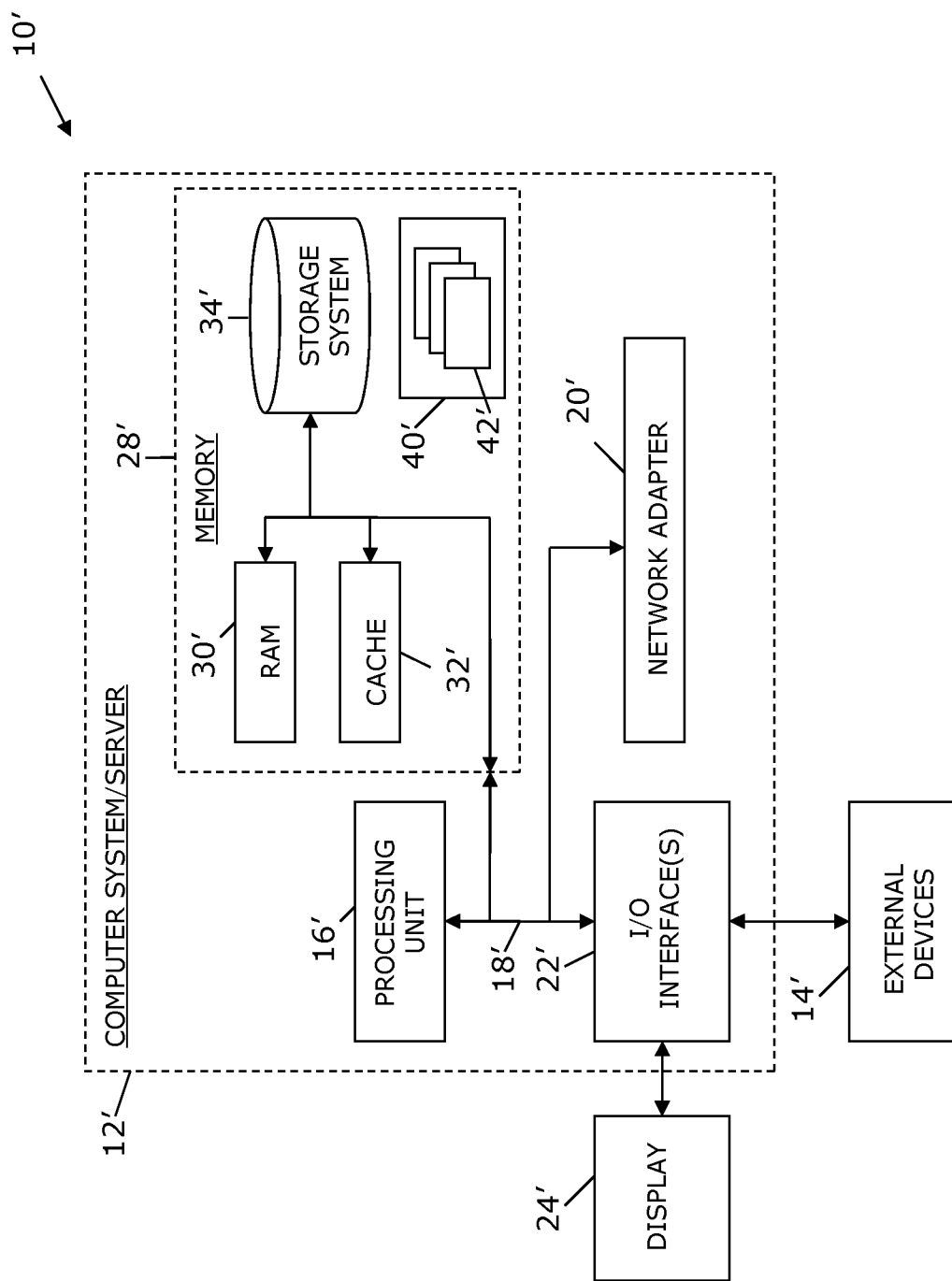
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   utilizing at least one processor to execute computer code that performs the steps of:
   receiving a plurality of data for job processing, wherein the job processing processes the plurality of data into (i) at least one map phase processed using at least one map function and (ii) at least one reduce phase processed using at least one reduce function;
   generating a plurality of key-value groups from the plurality of data, wherein the plurality of key-value groups are grouped from data pairs comprising a key and a value produced using at least one map function and wherein each of the key-value groups comprises a grouping of data pairs having a common key and a plurality of values associated with the common key;
   identifying, across the key-value groups, values common to more than one of the key-value groups;
   generating, based upon the identified values common to more than one of the key-value groups, new key-value groups from the key-value groups, wherein each of the new key-value groups comprises a grouping of data pairs having the identified common values and common keys corresponding to the more than one key-value groups, wherein generating the new key-value groups is performed irrespective of an assigned reduce function for the key-value groups; and
   communicating the new key-value groups to the at least one reduce function for processing, wherein the at least one reduce function is selected and scheduled after the new key-value groups are generated and wherein the new key-value groups scheduled for a reduce function are based upon an overlap between values within the new key-value groups that are scheduled for a given reduce function.

2. The method of claim 1, comprising identifying from the new key-value groups, new key-value groups having values common to at least two keys.

3. The method of claim 2, wherein the communicating the new key-value groups comprises communicating the new key-value groups having values common to at least two keys to a single reduce function.

4. The method of claim 1, comprising performing the at least one reduce function on the new key-value groups.

5. The method of claim 4, wherein the performing comprises storing the new key-value groups communicated to the at least one reduce function at local cache.

6. The method of claim 5, wherein the performing comprises retrieving the common keys and the common values from the local cache.

7. The method of claim 4, wherein the performing comprises receiving non-common keys and non-common values from the at least one map function.

8. The method of claim 4, wherein the processing comprises scheduling the new key-value groups to at least one reduce function based upon an optimal amount of data sharing.

9. An apparatus, comprising:
   at least one processor; and
   a computer readable storage medium having computer readable program code embodied therewith and executable by the at least one processor, the computer readable program code comprising:
   computer readable program code that receives a plurality of data for job processing, wherein the job processing processes the plurality of data into (i) at least one map phase processed using at least one map function and (ii) at least one reduce phase processed using at least one reduce function;
   computer readable program code that generates a plurality of key-value groups from the plurality of data, wherein the plurality of key-value groups are grouped from data pairs comprising a key and a value produced using the at least one map function and wherein each of the key-value groups comprises a grouping of data pairs having a common key and a plurality of values associated with the common key;
   computer readable program code that identifies, across the key-value groups, values common to more than one of the key-value groups;
   computer readable program code that generates, based upon the identified values common to more than one of the key-value groups, new key-value groups from the key-value groups, wherein each of the new key-value groups comprises a grouping of data pairs having the identified common values and common keys corresponding to the more than one key-value groups, wherein generating the new key-value groups is performed irrespective of an assigned reduce function for the key-value groups; and
   computer readable program code that communicates the new key-value groups to the at least one reduce function for processing, wherein the at least one reduce function is selected and scheduled after the new key-value groups are generated and wherein the new key-value groups scheduled for a reduce function are based upon an overlap between values within the new key-value groups that are scheduled for a given reduce function.

10. A computer program product, comprising:
    a computer readable storage medium having computer readable program code embodied therewith, the computer readable program code executable by a processor and comprising:
    computer readable program code that receives a plurality of data for job processing, wherein the job processing processes the plurality of data into (i) at least one map phase processed using at least one map function and (ii) at least one reduce phase processed using at least one reduce function;

computer readable program code that generates a plurality of key-value groups from the plurality of data, wherein the plurality of key-value groups are grouped from data pairs comprising a key and a value produced using the at least one map function and wherein each of the key-value groups comprises a grouping of data pairs having a common key and a plurality of values associated with the common key;

computer readable program code that identifies, across the key-value groups, values common to more than one of the key-value groups;

computer readable program code that generates, based upon the identified values common to more than one of the key-value groups, new key-value groups from the key-value groups, wherein each of the new key-value groups comprises a grouping of data pairs having the identified common values and common keys corresponding to the more than one key-value groups, wherein generating the new key-value groups is performed irrespective of an assigned reduce function for the key-value groups; and computer readable program code that communicates the new key-value groups to the at least one reduce function for processing, wherein the at least one reduce function is selected and scheduled after the new key-value groups are generated and wherein the new key-value groups scheduled for a reduce function based upon an overlap between values within the new key-value groups that are scheduled for a given reduce function.

11. The computer program product of claim 10, comprising identifying from the new key-value groups, new key-value groups having values common to at least two keys.

12. The computer program product of claim 11, wherein the communicating the new key-value groups comprises communicating the new key-value groups having values common to at least two keys to a single reduce function.

13. The computer program product of claim 10, comprising performing the at least one reduce function on the new key-value groups.

14. The computer program product of claim 13, wherein the performing comprises storing the new key-value groups communicated to the at least one reduce function at local cache.

15. The computer program product of claim 14, wherein the performing comprises retrieving the common keys and the common values from the local cache.

16. The computer program product of claim 13, wherein the performing comprises receiving non-common keys and non-common values from the at least one map function.

17. The computer program product of claim 13, wherein the processing comprises scheduling the new key-value groups to at least one reduce function based upon an optimal amount of data sharing.

18. A method, comprising:
utilizing at least one processor to execute computer code that performs the steps of:
processing, using at least one map function to process map phase data and at least one reduce function to process reduce phase data, a plurality of data;
wherein the processing comprises:
producing, using the at least one map function, key-value pairs comprising a key and a value from the plurality of data;
grouping at least a subset of the key-value pairs into key-value groups comprising a key shared with a plurality of values, wherein the grouping is performed irrespective of the at least one reduce function the key-value pairs being grouped are assigned to;
identifying, across the key-value groups, values common to more than one of the key-value groups;
grouping the key-value groups into new key-value groups, wherein each new key-value group comprises a grouping of data pairs having the identified common values and keys shared by the identified common values wherein the grouping the key-value groups into new key-value groups is performed irrespective of an assigned reduce function for the key-value groups; and
processing, using a reduce function, (i) the new key-value groups, (ii) the key-value groups not belonging to any of the new key-value groups, and (iii) the key-value pairs not belonging to any of the key-value groups, wherein the reduce function is selected and scheduled after the new key-value groups are grouped and wherein the new key-value groups scheduled for a reduce function are based upon an overlap between values within the new key-value groups that are scheduled for a given reduce function.

* * * * *